No. 760,370. PATENTED MAY 17, 1904.
T. M. ARNOLD.
VEHICLE TIRE.
APPLICATION FILED MAY 4, 1903.
NO MODEL.

Witnesses:
Oscar F. Hill
Aline Tarr

Inventor:
Thomas M. Arnold
By Macleod Calver & Randall
Attorneys.

No. 760,370.

Patented May 17, 1904.

UNITED STATES PATENT OFFICE.

THOMAS M. ARNOLD, OF HAVERHILL, MASSACHUSETTS.

VEHICLE-TIRE.

SPECIFICATION forming part of Letters Patent No. 760,370, dated May 17, 1904.

Application filed May 4, 1903. Serial No. 155,508. (No model.)

*To all whom it may concern:*

Be it known that I, THOMAS M. ARNOLD, a citizen of the United States, residing at Haverhill, in the county of Essex, State of Massachusetts, have invented a certain new and useful Improvement in Tires for Vehicles, of which the following is a specification, reference being had therein to the accompanying drawings.

Tires for automobiles and other road-vehicles are now frequently made from rubber. Rubber tires, while possessing many advantages, are open to some objections. They are expensive, are relatively short-lived, are liable to slip on smooth wet pavements, and when they are constructed with an inner air-chamber they are liable to be cut or punctured in use, thus impairing or destroying their efficiency.

My invention has for its object to produce a tire which while possessing the advantages of a rubber tire in affording a good traction-surface on dry pavements or roads in and possessing to a considerable degree the resiliency or elasticity of rubber will also be very durable and free from the other objections above noted with respect to rubber tires.

My invention is fully set forth in the following description, in which reference is made to the accompanying drawings, and the novel features thereof are pointed out and clearly defined in the claims at the close of the specification.

Figure 1:
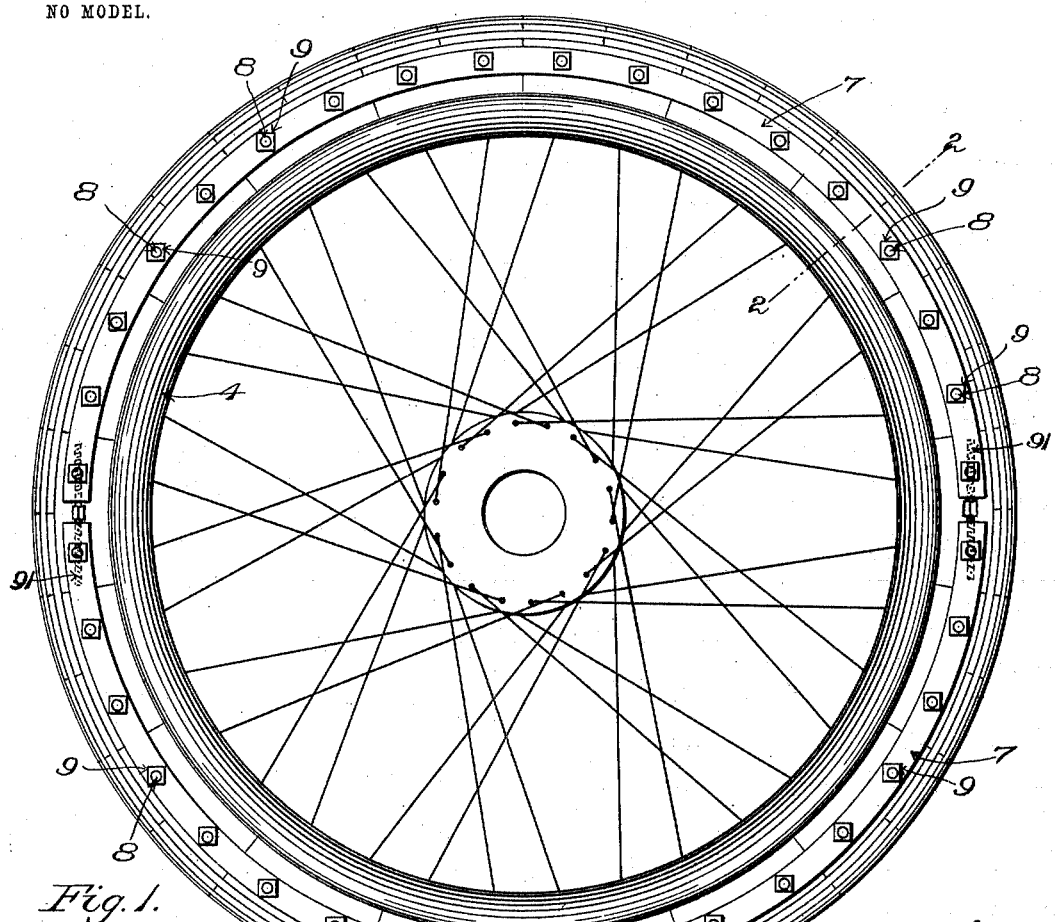
Figures 2, 3, 4:
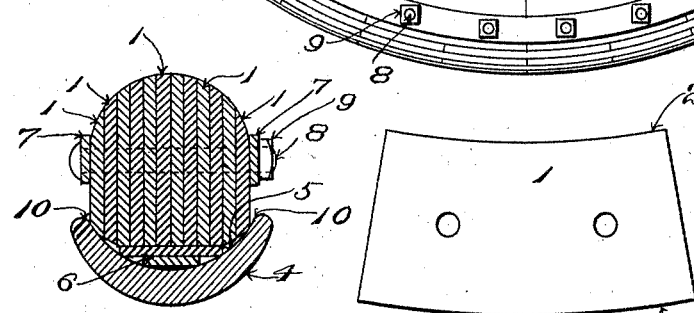

In the drawings, Figure 1 is a side elevation of a wheel provided with a tire embodying my invention. Fig. 2 is a cross-section on line 2 2, Fig. 1. Fig. 3 is a plan of one of the pieces or sections of leather which I use in building up my tire. Fig. 4 is a detail in larger size hereinafter referred to.

In the construction of my tire I employ leather, preferably a good quality of sole-leather. For the purpose of reducing the cost of construction I may use comparatively small pieces of leather from which are cut sections or pieces 1 of the general shape shown, Fig. 3. The opposite sides of these sections of leather are cut in the curved shape indicated by the lines 2 and 3, respectively, the line 2 being substantially an arc of a circle corresponding with the periphery of the felly of the wheel to which the tire is to be applied.

The tire is built up from sections of leather preferably of the shape shown, Fig. 3. These are laid side by side with their inner edges resting upon or in proximity to the felly of the wheel and with their flat sides in the plane of revolution of the wheel—that is to say, they are set radially and extending lengthwise substantially parallel with the periphery of the felly. In laying them the joints between the sections are preferably broken, as indicated in Fig. 1. When enough sections or pieces 1 have been laid side by side to form a tire of the desired width, the said pieces or sections of which it is composed are firmly compressed and held together, which may be done in any well-known manner. In the drawings I have shown one method of securing these sections or pieces together, this method being preferably employed by me when the tire is designed for use with a wheel not especially made to receive it, as when it is to be applied to a wheel which, for example, has previously been provided with a pneumatic rubber tire. I will now describe this specific construction.

The felly of the wheel is shown at 4, Fig. 2, and is one of the forms now in common use. This felly is provided with a cavity 5, corresponding substantially in shape with the exterior shape of the felly. I first preferably partially fill this cavity with strips of leather 6 or equivalent material. The filling 6 serves merely as a base upon which the inner edges of the sections which compose my tire may rest firmly, as will be clear from Fig. 2. If the felly were flat in cross-section, this would be unnecessary. To apply my tire to a wheel of this construction, the felly being one piece, I build the tire up in two or more equal sections, each being of a width to fit within the space between the points 10 10 of the felly. The tire shown, Fig. 1, is formed in two equal sections or halves; but more than two sections may be employed, if desired—that is, it may be formed in quarters, thirds, &c. On each side of the said equal sections comprising the tire proper I place a semicircular strip or plate 7, preferably of metal, the whole being secured together by a series of bolts 8, which pass through each of the strips or plates 7 and through the intervening pieces or sections of leather. The bolts 8 are provided at the outer side of one of the plates with nuts 9, by screwing up which the strips of leather may be firmly compressed and secured together. When the strips are thus compressed or forced together, the frictional contact between them is sufficient to hold them very securely in place. The halves of the tire which are thus prepared are then placed on the felly of the wheel, the end sections of each half being inserted between the end sections of the opposite half, and the halves of the tire may then be firmly drawn together and secured by any suitable means. For thus drawing them together and securing them in place I prefer to employ right and left threaded bolts 91, which are screwed into tapped holes in the bolts 8 which are nearest the end of each of the halves or sections of the tire. For greater clearness I have shown this device in Fig. 4 detached from the tire. To accommodate the bolts 91, as also to permit of their being turned, one or more of the adjacent sections 1 may require to be partially cut away. As will be clear, by turning the right and left threaded bolts 91 the two halves of the tire may be drawn firmly together and thereby firmly secured to the felly of the wheel. In the same manner the tire may be tightened or drawn up should it become loose. After the tire is in position the wheel is preferably mounted upon a shaft so that it may be revolved, and the periphery of the tire is then finished by turning or grinding it down to the desired shape.

As will be clear, the leather used in the construction of my tire may be filled or stuffed with various well-known compositions which will have the effect of making it waterproof or making it more or less hard or dense, as desired, for the various conditions of use.

The completed tire may also be treated in like manner to give it varying kinds of finish, as desired.

While I have referred in the foregoing description to leather as the material from which my tire is made, and so far as I am now aware this material is preferable to any other, I do not desire to limit myself to the employment of leather, since there are many materials—such, for example, as rawhide—which are well-known equivalents for leather in many of its uses and which possess some of the advantages of leather in the construction of a tire embodying my invention.

What I claim is—

1. A tire formed in two or more sections each composed of pieces of leather or similar material having their flat sides in the plane of rotation of the wheel, independent side plates on each side of the said leather portion, transverse clamping-bolts therefor, and securing means whereby the said sections are secured together, substantially as described.

2. A tire formed in two or more sections composed of pieces of leather or similar material having their flat sides in the plane of rotation of the wheel, clamping means for holding the said pieces together, and securing means whereby the said sections of the said tire are held firmly to each other and to the felly of the wheel, substantially as described.

3. A tire formed in two or more sections each composed of pieces of leather or similar material having their flat sides in the plane of rotation of the wheel, clamping means for holding the said pieces together, said clamping means comprising side plates for each section, and transverse connecting-bolts, and right and left screws working in threaded holes in end bolts of each section and adjustably securing said sections together, substantially as described.

In testimony whereof I affix my signature in presence of two witnesses.

THOMAS M. ARNOLD.

Witnesses:
Wm. A. Macleod,
Alice H. Morrison.